United States Patent
Makino et al.

(10) Patent No.: US 10,805,475 B2
(45) Date of Patent: Oct. 13, 2020

(54) RESONANCE SOUND SIGNAL GENERATION DEVICE, RESONANCE SOUND SIGNAL GENERATION METHOD, NON-TRANSITORY COMPUTER READABLE MEDIUM STORING RESONANCE SOUND SIGNAL GENERATION PROGRAM AND ELECTRONIC MUSICAL APPARATUS

(71) Applicant: YAMAHA CORPORATION, Hamamatsu-shi (JP)

(72) Inventors: Takaaki Makino, Hamamatsu (JP); Masafumi Nakata, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/593,169

(22) Filed: Oct. 4, 2019

(65) Prior Publication Data
US 2020/0112642 A1   Apr. 9, 2020

(30) Foreign Application Priority Data
Oct. 5, 2018   (JP) .................. 2018-190403

(51) Int. Cl.
*H04M 1/00* (2006.01)
*H04M 19/04* (2006.01)
(Continued)

(52) U.S. Cl.
CPC ........ *H04M 19/041* (2013.01); *G10H 1/0091* (2013.01); *G10H 1/08* (2013.01);
(Continued)

(58) Field of Classification Search
CPC .. G10H 2210/271; G10H 1/0091; G10H 1/08; G10H 1/44; G10H 2210/066;
(Continued)

(56) References Cited

U.S. PATENT DOCUMENTS

| 4,909,121 A | 3/1990 | Usa |
| RE35,813 E | 6/1998 | Usa |

(Continued)

FOREIGN PATENT DOCUMENTS

| JP | S6491192 A | 4/1989 |
| JP | H0693189 B2 | 11/1994 |

(Continued)

*Primary Examiner* — Nhan T Le
(74) *Attorney, Agent, or Firm* — Rossi, Kimms & McDowell LLP

(57) ABSTRACT

A resonance sound signal generation device comprises a designation receiver that receives designation of a pitch, a sound signal instructor that provides an instruction for generating a sound signal corresponding to the designated pitch, a producer that produces a resonance sound signal representing a resonance sound based on a plurality of pitches, a determiner that determines whether another pitch is designated at a time of designation of one pitch, and a resonance sound instructor that instructs the producer to produce a resonance sound signal of the one pitch and a resonance sound signal of the another pitch based on the one pitch and the another pitch when determination is made that the another pitch is designated at the time of designation of the one pitch, and does not instruct the producer to produce resonance sound signals when determination is made that the another pitch is not designated at the time of designation of the one pitch.

17 Claims, 12 Drawing Sheets

(51) Int. Cl.
*G10H 1/00* (2006.01)
*G10H 1/44* (2006.01)
*G10H 1/08* (2006.01)

(52) U.S. Cl.
CPC ......... *G10H 1/44* (2013.01); *G10H 2210/056* (2013.01); *G10H 2210/071* (2013.01)

(58) Field of Classification Search
CPC ............... G10H 2210/071; G10H 1/06; G10H 2210/056; G10H 2210/211; H04M 19/041
See application file for complete search history.

(56) References Cited

U.S. PATENT DOCUMENTS

| | | | |
|---|---|---|---|
| 7,476,797 B2* | 1/2009 | Izumisawa | G10H 1/0091 |
| | | | 84/615 |
| 7,642,445 B2* | 1/2010 | Izumisawa | G10H 1/0575 |
| | | | 84/622 |
| 7,977,564 B2* | 7/2011 | Takigawa | G10H 1/346 |
| | | | 84/171 |
| 9,489,933 B2* | 11/2016 | Itoh | G10H 1/14 |
| 2001/0027714 A1 | 10/2001 | Kondo | |
| 2015/0228261 A1 | 8/2015 | Nakata | |

FOREIGN PATENT DOCUMENTS

| | | |
|---|---|---|
| JP | 2001236064 A | 8/2001 |
| JP | 2012220861 A | 11/2012 |
| JP | 2015143763 A | 8/2015 |

\* cited by examiner

RESONANCE SOUND SIGNAL GENERATION DEVICE, RESONANCE SOUND SIGNAL GENERATION METHOD, NON-TRANSITORY COMPUTER READABLE MEDIUM STORING RESONANCE SOUND SIGNAL GENERATION PROGRAM AND ELECTRONIC MUSICAL APPARATUS

BACKGROUND OF THE INVENTION

Field of the Invention

The present invention relates to a resonance sound signal generation device, a resonance sound signal generation method and a non-transitory computer readable medium storing a resonance sound signal generation program, for generating a resonance sound signal, and an electronic musical apparatus including the resonance sound signal generation device.

Description of Related Art

In a case where chords are played in a natural keyboard musical instrument such as an acoustic piano, a resonance sound is generated. That is, in a case where keys of a plurality of pitches are depressed, the strings corresponding to the plurality of depressed keys resonate with each other, and a resonance sound is generated. Conventionally, an electronic piano has been known as an attempt to electronically reproduce a resonance sound generated by an acoustic piano. For example, the resonance sound production device described in JP 2015-143763 A simulates and produces a resonance sound of the acoustic piano.

BRIEF SUMMARY OF THE INVENTION

The resonance sound production device described in JP 2015-143763 A generates a resonance sound when a plurality of pitches are designated. This resonance sound production device generates a resonance sound simulating a resonance sound generated by an acoustic piano when a player plays chords. However, further improvement is desired in order for the resonance sound production device to reproduce a resonance sound generated in the actual acoustic piano.

An object of the present invention is to provide a resonance sound signal generation device and an electronic musical apparatus that can generate a resonance sound closer to a resonance sound generated in a natural keyboard musical instrument, and a resonance sound signal generation method and a non-transitory computer readable medium storing a resonance sound signal generation program by which the resonance sound closer to the resonance sound generated in the natural keyboard musical instrument can be generated.

A resonance sound signal generation device according to one aspect of the present invention comprises a designation receiver configured to receive designation of a pitch, a sound signal instructor configured to provide an instruction for generating a sound signal corresponding to the designated pitch, a producer configured to produce a resonance sound signal representing a resonance sound based on a plurality of pitches, a determiner configured to determine whether another pitch is designated at a time of designation of one pitch, and a resonance sound instructor configured to instruct the producer to produce a resonance sound signal of the one pitch based on the another pitch and a resonance sound signal of the another pitch based on the one pitch in a case where a determination is made that the another pitch is designated at the time of designation of the one pitch, and configured to not instruct the producer to produce a resonance sound signal in a case where a determination is made that the another pitch is not designated at the time of designation of the one pitch.

The resonance sound instructor may be configured to instruct the producer to continue producing a resonance sound signal of the another pitch based on a third pitch in a case where the another pitch and the third pitch are designated at a time of cancellation of designation of the third pitch.

The resonance sound instructor may be configured to instruct the producer to stop producing resonance sound signals in a case where no other pitch is designated at a time of cancellation of designation of any pitch.

A resonance sound signal generation device according to another aspect of the present invention comprises a designation receiver configured to receive designation of a pitch in a first pitch region that includes a plurality of pitches and to which a damper effect is assigned and to receive designation of a pitch in a second pitch region that includes one or more pitches and to which the damper effect is not assigned, a sound signal instructor configured to provide an instruction for generating a sound signal corresponding to a designated pitch, a producer configured to produce resonance sound signals representing resonance sounds based on the plurality of pitches, a determiner configured to determine whether another pitch is designated at a time of designation of one pitch, and a resonance sound instructor configured to instruct the producer to produce a resonance sound signal of the one pitch, a resonance sound signal of the another pitch, and a resonance sound signal of a pitch in the second pitch region based on the one pitch and the another pitch in a case where a determination is made that the another pitch is designated at the time of designation of the one pitch, and configured to instruct the producer to produce the resonance sound signal of the pitch in the second pitch region based on the one pitch in a case where a determination is made that the another pitch is not designated at the time of designation of the one pitch.

The resonance sound instructor may be configured to instruct the producer to continue producing the resonance sound signal of the pitch in the second pitch region in a case where no other pitch is designated at a time of cancellation of designation of any pitch.

The resonance sound signal generation device may further comprise a multiple dampers operation receiver configured to receive information indicating application or cancellation of the damper effect with respect to the plurality of pitches in the first pitch region, wherein the resonance sound instructor may be configured to instruct the producer to continue producing a resonance sound signal of the designated pitch and the resonance sound signal of the pitch in the second pitch region, and may be configured to instruct the producer to stop producing a resonance sound signal of a pitch in the first pitch region except for the resonance sound signal of the designated pitch, at a time of reception of the information indicating application of the damper effect.

The resonance sound signal generation device may further comprise an enhancement mode receiver configured to receive information indicating an enhancement mode in which generation of a resonance sound signal of a pitch in a third pitch region is enabled, the third pitch region being not designatable by the designation receiver, wherein the resonance sound instructor may be configured to instruct the producer to produce the resonance sound signal of the designated pitch and a resonance sound signal of a pitch in the third pitch region in a case where the enhancement mode is in an ON state at a time of reception of information indicating cancellation of the damper effect.

A resonance sound signal generation method according to yet another aspect of the present invention includes receiving designation of a pitch, providing an instruction for generating a sound signal corresponding to the designated pitch, producing a resonance sound signal representing a resonance sound based on a plurality of pitches, determining whether another pitch is designated at a time of designation of one pitch, and providing an instruction for producing a resonance sound signal of the one pitch based on the another pitch and a resonance sound signal of the another pitch based on the one pitch in a case where a determination is made that the another pitch is designated at the time of designation of the one pitch, and not providing an instruction for producing a resonance sound signal in a case where a determination is made that the another pitch is not designated at the time of designation of the one pitch.

The resonance sound signal generation method may further include providing an instruction for continuing production of a resonance sound signal of the another pitch based on a third pitch in a case where the another pitch and the third pitch are designated at a time of cancellation of designation of the third pitch.

The resonance sound signal generation method may further include providing an instruction for stopping production of resonance sound signals in a case where no other pitch is designated at a time of cancellation of designation of any pitch.

A resonance sound signal generation method according to yet another aspect of the present invention includes receiving designation of a pitch in a first pitch region that includes a plurality of pitches and to which a damper effect is assigned and receiving designation of a pitch in a second pitch region that includes one or more pitches and to which the damper effect is not assigned, providing an instruction for generating a sound signal corresponding to a designated pitch, producing resonance sound signals representing resonance sounds based on the plurality of pitches, determining whether another pitch is designated at a time of designation of one pitch, and providing an instruction for producing a resonance sound signal of the one pitch, a resonance sound signal of the another pitch, and a resonance sound signal of a pitch in the second pitch region based on the one pitch and the another pitch in a case where a determination is made that the another pitch is designated at the time of designation of the one pitch, and providing an instruction for producing the resonance sound signal of the pitch in the second pitch region based on the one pitch in a case where a determination is made that the another pitch is not designated at the time of designation of the one pitch.

The resonance sound signal generation method may further include providing an instruction for continuing production of the resonance sound signal of the pitch in the second pitch region in a case where no other pitch is designated at a time of cancellation of designation of any pitch.

The resonance sound signal generation method may further include receiving information indicating application or cancellation of the damper effect with respect to the plurality of pitches in the first pitch region, wherein an instruction for continuing production of a resonance sound signal of the designated pitch and the resonance sound signal of the pitch in the second pitch region is provided, and an instruction for stopping production of a resonance sound signal of a pitch in the first pitch region except for the resonance sound signal of the designated pitch is provided, at a time of reception of the information indicating application of the damper effect.

The resonance sound signal generation method may further include receiving information indicating an enhancement mode in which generation of a resonance sound signal of a pitch in a third pitch region is enabled, the third pitch region being not designatable, wherein an instruction for producing the resonance sound signal of the designated pitch and a resonance sound signal of a pitch in the third pitch region is provided in a case where the enhancement mode is in an ON state at a time of reception of information indicating cancellation of the damper effect.

A non-transitory computer readable medium according to yet another aspect of the present invention stores a resonance sound signal generation program, wherein the resonance sound signal generation program allows a computer to execute a process of receiving designation of a pitch, a process of providing an instruction for generating a sound signal corresponding to the designated pitch, a process of producing a resonance sound signal representing a resonance sound based on a plurality of pitches, a process of determining whether another pitch is designated at a time of designation of one pitch, and a process of providing an instruction for producing a resonance sound signal of the one pitch based on the another pitch and a resonance sound signal of the another pitch based on the one pitch in a case where a determination is made that the another pitch is designated at the time of designation of the one pitch, and not providing an instruction for producing a resonance sound signal in a case where a determination is made that the another pitch is not designated at the time of designation of the one pitch.

An electronic musical apparatus according to yet another aspect of the present invention comprises a plurality of performance operators configured to designate pitches, respectively, any resonance sound signal generation device described above, a tone generator configured to generate a sound signal as instructed by the resonance sound signal generation device, and an outputter configured to output a sound having a designated pitch and a resonance sound relating to the designated pitch based on the sound signal generated by the tone generator and a resonance sound signal produced by the resonance sound signal generation device.

The present invention enables provision of a resonance sound signal generation device and an electronic musical apparatus that can generate a resonance sound similar to a resonance sound generated by an acoustic piano, and a resonance sound signal generation method and a non-transitory computer readable medium storing a resonance sound signal generation program by which a resonance sound similar to a resonance sound generated by the acoustic piano can be generated.

Other features, elements, characteristics, and advantages of the present invention will become more apparent from the following description of preferred embodiments of the present invention with reference to the attached drawings.

DESCRIPTION OF THE PREFERRED EMBODIMENTS

[1] Resonance Sound in Acoustic Piano

Figure 1:
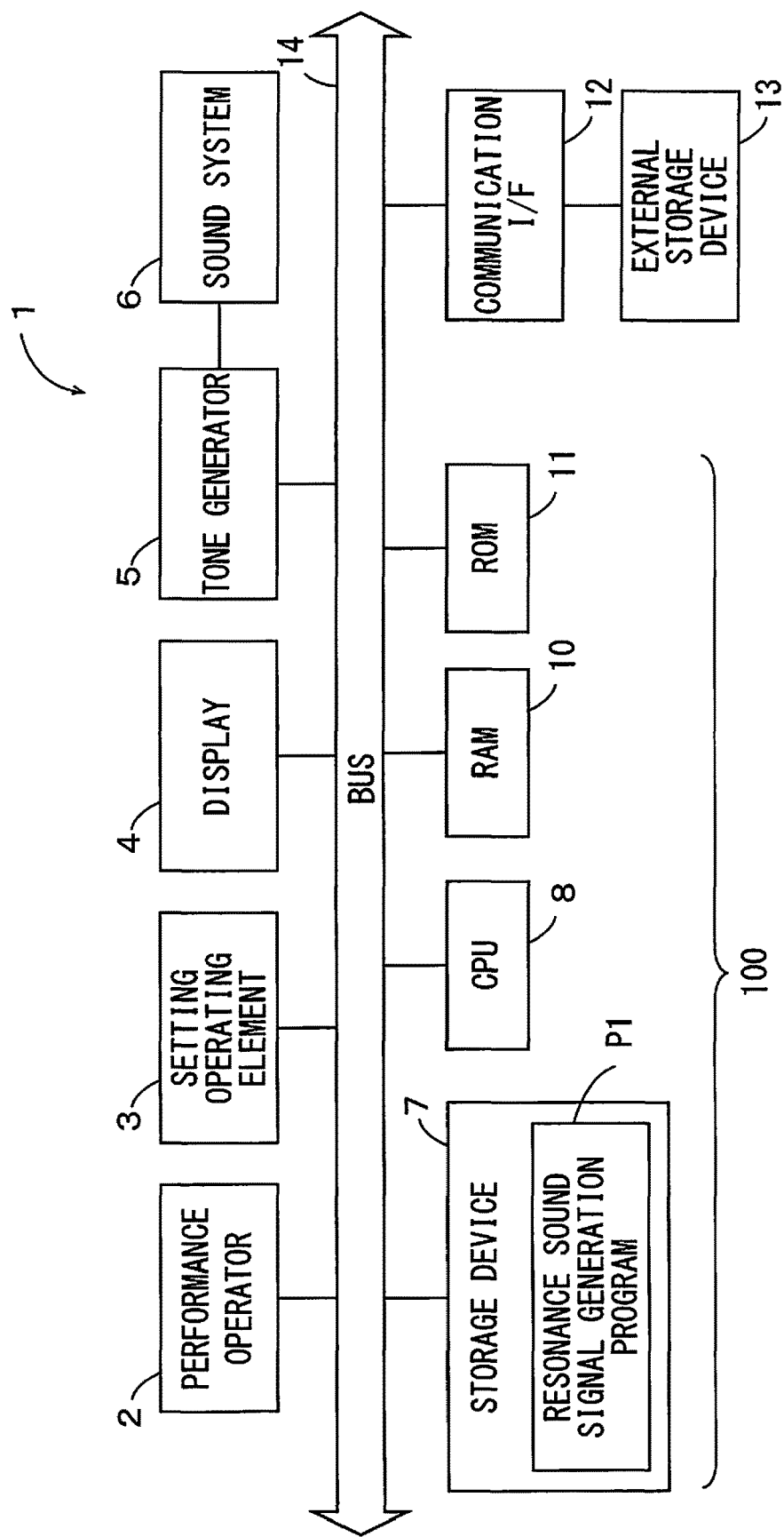
FIG. 1 is a block diagram showing the configuration of an electronic musical apparatus including a resonance sound signal generation device according to embodiments of the present invention.

The mechanism for generating a resonance sound in an acoustic piano will be described prior to the description of embodiments of the present invention. The acoustic piano comprises a plurality of keys. The acoustic piano comprises a plurality of strings that correspond to the plurality of keys and respectively generate sounds corresponding to the pitches of the keys. Dampers are in contact with the plurality of strings respectively. When a key is not being depressed, the damper is in contact with the string. Thus, the string does not vibrate, and a sound is not generated. When the key is depressed, the damper that has been in contact with the string corresponding to the key is released from the string. Thus, the string corresponding to the depressed key vibrates, and the sound corresponding to the pitch of the depressed key is generated.

A player depresses a plurality of keys in a case where playing chords. When the plurality of keys are depressed, the dampers corresponding to all of the depressed keys are released from the strings respectively, and the sounds corresponding to all of the pitches of the depressed keys are generated. For example, when the keys corresponding to a sound of "C" and a sound of "E" are depressed, dampers are released from the strings corresponding to the sound of "C" and the sound of "E." Thus, the strings corresponding to the sound of "C" and the sound of "E" vibrate, and the sound of "C" and the sound of "E" are generated. Further, the sound of "C" is generated, whereby the string corresponding to the sound of "E" resonates based on the sound of "C," and a resonance sound is generated. Similarly, the sound of "E" is generated, whereby the string corresponding to the sound of "C" resonates based on the sound of "E," and a resonance sound is generated. In the meantime, as for the keys of pitches except for the pitches of the sound of "C" and the sound of "E," the dampers are in contact with the corresponding strings, so that a resonance sound is not generated.

As described above, in the acoustic piano, in a case where the key of a first pitch and the key of a second pitch are depressed, the string of the first pitch and the string of the second pitch vibrate. Thus, a sound of the first pitch and a sound of the second pitch are generated. At the same time, the string of the second pitch vibrates based on the sound of the first pitch, and a resonance sound is generated in the string of the second pitch. The string of the first pitch vibrates based on the sound of the second pitch, and a resonance sound is generated in the string of the first pitch.

In this manner, a resonance sound is generated in regards to depressed keys in the acoustic piano when the plurality of keys are depressed. In the present embodiment, a resonance sound generated in the acoustic piano is reproduced electronically. Therefore, an electronic musical apparatus does not have strings or dampers that come into contact with the strings. Thus, the resonance sound generated in the string of the second pitch when the string of the second pitch vibrates based on the first pitch is referred to as "a resonance sound of the second pitch based on the first pitch," and the resonance sound generated in the string of the first pitch when the string of the first pitch vibrates based on the second pitch is referred to as "a resonance sound of the first pitch based on the second pitch."

Hereinafter, a resonance sound signal generation device, a resonance sound signal generation method, a non-transitory computer readable medium storing a resonance sound signal generation program and an electronic musical apparatus according to the embodiments of the present invention will be described below in detail with reference to drawings.

[2] First Embodiment (1) Configuration of Electronic Musical Apparatus

FIG. 1 is a block diagram showing the configuration of the electronic musical apparatus 1 including the resonance sound signal generation device 100 according to the embodiments of the present invention. The electronic musical apparatus 1 including the resonance sound signal generation device 100 of the present embodiment is an apparatus that generates sounds electronically, thereby not having mechanical dampers. As such, the electronic musical apparatus 1 including the resonance sound signal generation device 100 of the present embodiment controls a resonance sound to generate the effect similar to the effect generated when a damper corresponding to a depressed key is released in a pseudo manner.

The electronic musical apparatus 1 of FIG. 1 is an electronic keyboard musical instrument, for example. The electronic musical apparatus 1 comprises a performance operator 2, setting operating elements 3 and a display 4. In the present embodiment, the performance operator 2 includes a keyboard having a plurality of keys arranged in a row and is connected to a bus 14. Pitches that ascend in order from the left to the right correspond to the plurality of keys arranged in a row. The keyboard includes 61 keys, for example. However, the number of keys included in the keyboard is not limited to this. The keyboard of the performance operator 2 may be an image of a keyboard displayed on a screen of a touch panel display, described below. In the electronic musical apparatus 1 in the first embodiment, all of the keys have the function similar to that of the keys having dampers in an acoustic piano. That is, in a case where none of the keys are depressed by the player, the control similar to the control to be carried out in a case where the dampers are working on all of the keys is carried out.

The setting operating elements 3 include operation switches that are operated in an on-off manner, operation switches that are operated in a rotational manner or operation switches that are operated in a sliding manner, etc. and are connected to the bus 14. These setting operating elements 3 are used for adjustment of the volume, on-off of a power supply and various settings including mode setting. The display 4 includes a liquid crystal display, for example, and is connected to the bus 14. A name of a musical piece, a music score or other various information is displayed on the display 4. The display 4 may be a touch panel display. In this case, part or all of the performance operator 2 or the setting operating elements 3 may be displayed on the display 4. A user can provide instructions for various operations by operating the display 4.

The electronic musical apparatus 1 comprises a tone generator 5 and a sound system 6. The tone generator 5 is connected to the bus 14 and outputs audio data (audio signals) based on the pitch designated by an operation using the performance operator 2. The audio data is sampling data (PCM (Pulse Code Modulation) data, for example) showing the waveform of a sound. Hereinafter, the audio data output by the tone generator 5 is referred to as a sound signal. The tone generator 5 stores sound signals of all pitches in advance. The sound system 6 includes a digital-analogue (D/A) conversion circuit, an amplifier and a speaker. The sound system 6 converts the sound signal supplied from the tone generator 5 into an analogue sound signal and generates a sound based on the analogue sound signal. The sound system 6 is an example of an outputter in the present invention.

The electronic musical apparatus 1 further comprises a storage device 7, a CPU (Central Processing Unit) 8, a RAM (Random Access Memory) 10, a ROM (Read Only Memory) 11 and a communication I/F (Interface) 12. The storage device 7, the CPU 8, the RAM 10, the ROM 11 and the communication I/F 12 are connected to the bus 14. An external apparatus such as an external storage device 13 may be connected to the bus 14 via the communication I/F 12.

The storage device 7 includes a storage media such as a hard disc, an optical disc, a magnetic disc or a memory card. A computer program such as the resonance sound signal generation program P1 is stored in the storage device 7.

The RAM 10 is a volatile memory, for example, which is used as a working area for the CPU 8, and temporarily stores various data. The ROM 11 is a nonvolatile memory, for example, and stores a control program. The ROM 11 may store a computer program such as the resonance sound signal generation program P1. The CPU 8 executes the resonance sound signal generation program P1 stored in the storage device 7 or the ROM 11 to perform the resonance sound signal generation method mentioned below. The storage device 7, the CPU 8, the RAM 10 and the ROM 11 constitute the resonance sound signal generation device 100.

The resonance sound signal generation program P1 may be supplied in the form of being stored in a recording media which is readable by a computer, and installed in the storage device 7 or the ROM 11. Further, the resonance sound signal generation program P1 may be stored in the external storage device 13. In addition, in a case where the communication I/F 12 is connected to a communication network, the resonance sound signal generation program P1 delivered from a server connected to the communication network may be installed in the storage device 7 or the ROM 11.

(2) Functional Configuration of Resonance Sound Signal Generation Device 100

Figure 2:
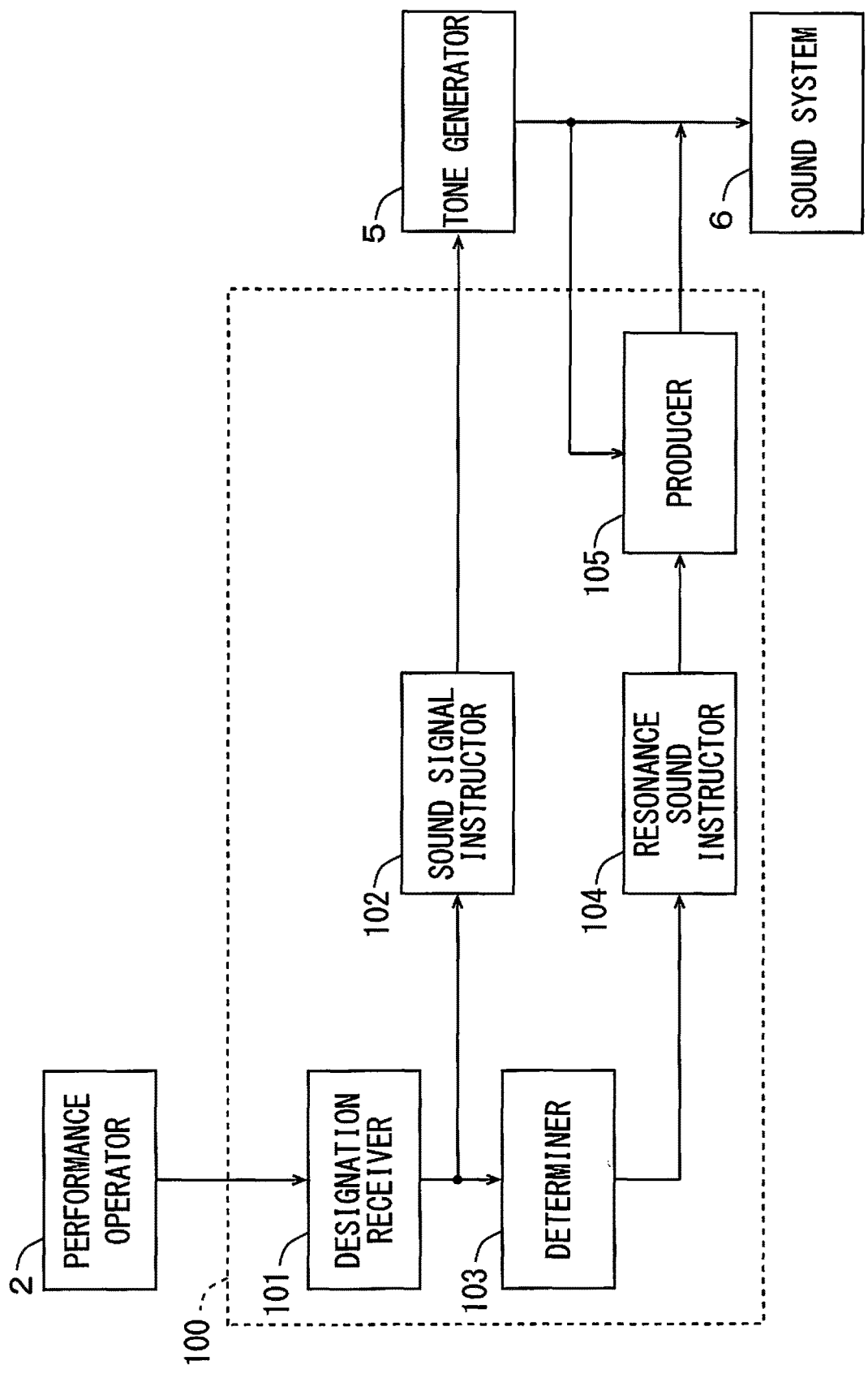
FIG. 2 is a block diagram showing the functional configuration of the resonance sound signal generation device and its peripheral devices according to a first embodiment.

FIG. 2 is a block diagram showing the functional configuration of the resonance sound signal generation device 100 and its peripheral devices. As shown in FIG. 2, the resonance sound signal generation device 100 includes a designation receiver 101, a sound signal instructor 102, a determiner 103, a resonance sound instructor 104 and a producer 105. The CPU 8 of FIG. 1 executes the resonance sound signal generation program P1 stored in the storage device 7 or the ROM 11 while using the RAM 10 as a working area, whereby the function of each constituent (101 to 105) of the resonance sound signal generation device 100 is realized.

When the user depresses a key in the performance operator 2, a note-on event (hereinafter abbreviated as a note-on) including the pitch corresponding to the depressed key is generated. The note-on corresponds to an ON state of the key. Further, when the user releases the key in the performance operator 2, a note-off event (hereinafter abbreviated as a note-off) including the pitch corresponding to the released key is generated. The note-off corresponds to an OFF state of the key.

The designation receiver 101 receives the designation information indicating a note-on or a note-off by an operation using the performance operator 2. That is, the designation receiver 101 detects the designation information. The detected designation information is supplied to the sound signal instructor 102 and the determiner 103.

The sound signal instructor 102 instructs the tone generator 5 to generate a sound signal based on the designation information. In a case where the designation information indicates a note-on for any pitch, the sound signal instructor 102 instructs the tone generator 5 to generate a sound signal of a designated pitch. In a case where the designation information indicates a note-off for any pitch, the sound signal instructor 102 instructs the tone generator 5 to stop generating a sound signal of a designated pitch.

The determiner 103 determines a pitch designation state based on the designation information. Specifically, the determiner 103 determines whether another pitch is designated at the time of detection of a note-on for any pitch. Further, the determiner 103 determines whether another pitch is designated at the time of detection of a note-off for any pitch.

The resonance sound instructor 104 instructs the producer 105 to produce or stop producing a resonance sound signal based on a result of determination by the determiner 103.

The producer 105 produces a resonance sound signal based on the instruction provided by the resonance sound instructor 104. In this case, the sound signal that is output from the tone generator 5 based on the instruction provided by the sound signal instructor 102 is supplied to the sound system 6 and supplied to the producer 105. In a case where sound signals of a plurality of pitches are output from the tone generator 5, the sound signals of the plurality of pitches are supplied to the producer 105. The producer 105 produces a resonance sound signal based on the instruction received from the resonance sound instructor 104 and the sound signals supplied from the tone generator 5.

(3) One Example of Resonance Sound Signal Generation Method

Figure 3:
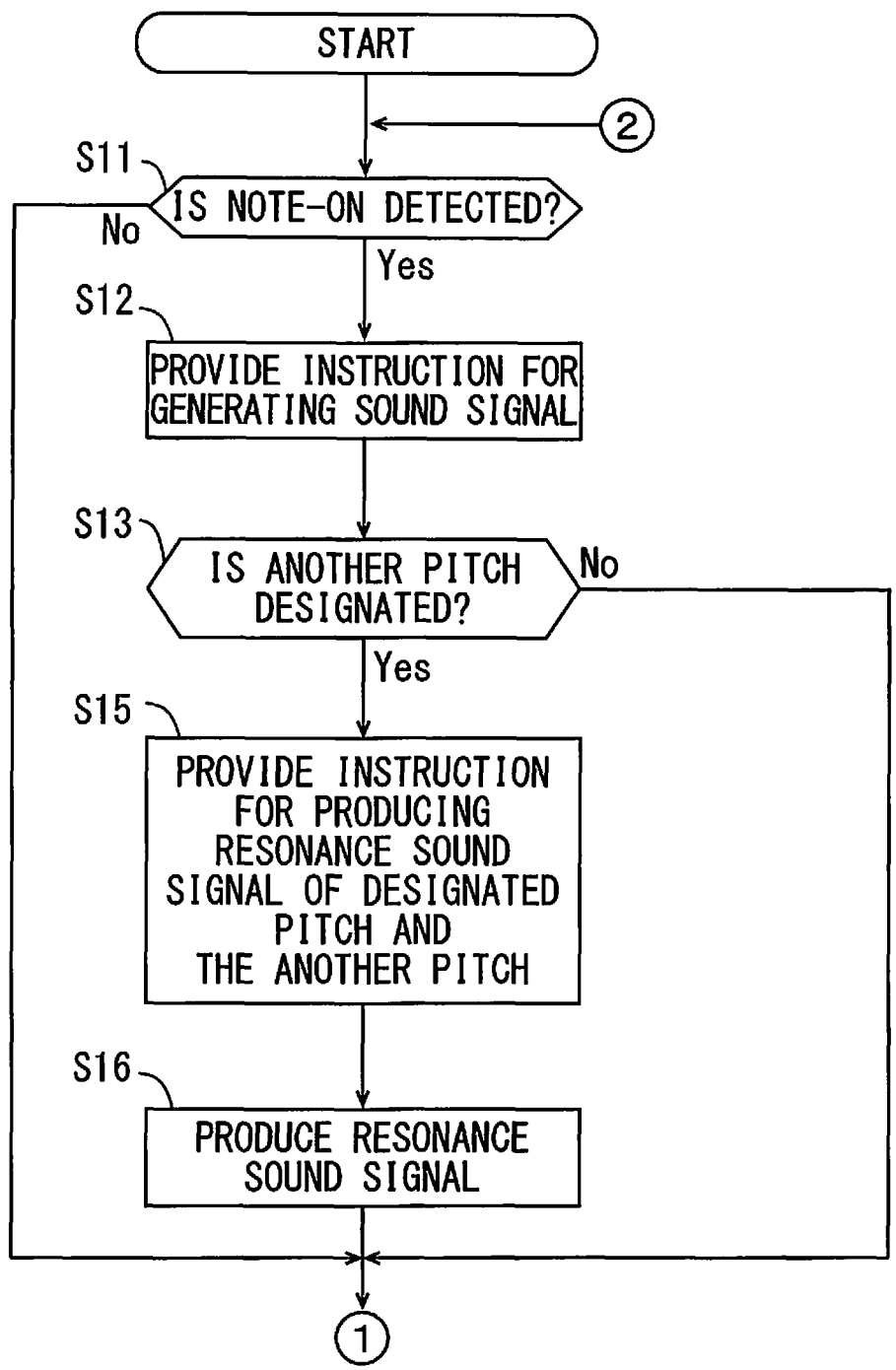
FIG. 3 is a flow chart showing a resonance sound signal generation method in the resonance sound signal generation device according to the first embodiment.
Figure 4:
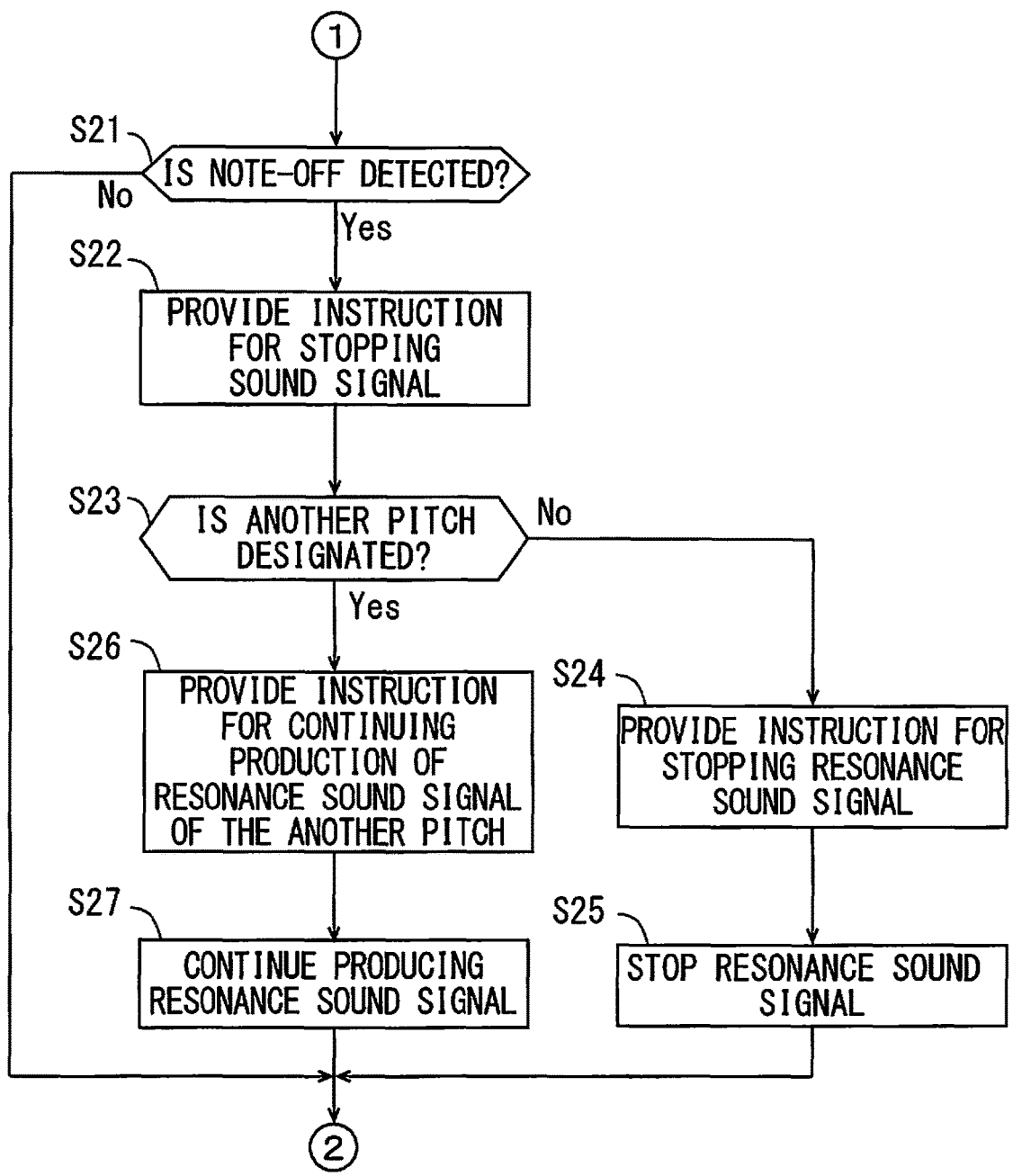
FIG. 4 is a flow chart showing the resonance sound signal generation method in the resonance sound signal generation device according to the first embodiment.

FIGS. 3 and 4 are flow charts showing the resonance sound signal generation method in the resonance sound signal generation device 100 of FIG. 2. The resonance sound signal generation method of FIGS. 3 and 4 is performed by execution by the CPU 8 of FIG. 1 of the resonance sound signal generation program P1 stored in the storage device 7 or the ROM 11.

Reference will be made to FIG. 3. First, the designation receiver 101 determines whether the designation information indicating a note-on has been detected (step S11). When the player depresses any key in the performance operator 2, the performance operator 2 supplies the designation information indicating a note-on for the pitch corresponding to the depressed key to the designation receiver 101.

In a case where the designation information indicating a note-on is not detected, the designation receiver 101 proceeds to the step S21.

In a case where the designation receiver 101 detects the designation information indicating a note-on, the sound signal instructor 102 instructs the tone generator 5 to generate the sound signal corresponding to the pitch designated by the designation information (step S12). Thus, the tone generator 5 outputs the audio data corresponding to the designated pitch to the sound system 6. The sound system 6 converts the audio data into an analogue sound signal, and outputs the sound corresponding to the converted analogue sound signal from the speaker. Thus, the sound corresponding to the key depressed by the player is output from the sound system 6.

In a case where the designation receiver 101 detects the designation information indicating a note-on, the determiner 103 determines whether another pitch is already designated at the point in time at which the designation information is received (step S13).

The determiner 103 saves the designation information that is supplied from the designation receiver 101 and indicates a note-on. The designation information supplied from the designation receiver 101 includes the information about pitches. Therefore, the determiner 103 can determine the pitch that is currently designated by a note-on.

When the determiner 103 determines that another pitch is designated, the resonance sound instructor 104 instructs the producer 105 to produce resonance sound signals (step S15). Specifically, the resonance sound instructor 104 instructs the producer 105 to produce the resonance sound signal of the pitch designated by a note-on and the resonance sound signal of the another pitch based on the pitch designated by the note-on and the another pitch.

The producer 105 produces resonance sound signals based on the instruction provided by the resonance sound instructor 104 (step S16). The resonance sound signals produced by the producer 105 are supplied to the sound system 6 and output as resonance sounds. Therefore, in a case where chords are played, resonance sounds are generated.

In the step S13, in a case where another pitch is not designated, the resonance sound instructor 104 does not instruct the producer 105 to produce a resonance sound signal. Then, the designation receiver 101 proceeds to the step S21 (FIG. 4). For example, in a case where a single sound is played, resonance sounds are not generated. In a case where the designation information indicating a note-on is not detected in the step S11, the designation receiver 101 proceeds to the step S21.

Reference will be made to FIG. 4. Next, the designation receiver 101 determines whether the designation information indicating a note-off has been detected (step S21). When the player releases any key in the performance operator 2, the performance operator 2 supplies the designation information indicating a note-off of the pitch corresponding to the released key to the designation receiver 101.

In a case where the designation receiver 101 detects the designation information indicating a note-off, the sound signal instructor 102 instructs the tone generator 5 to stop producing the sound signal corresponding to the pitch designated by the designation information (step S22). The tone generator 5 stops outputting the audio data corresponding to the designated pitch. Thus, the output of the sound corresponding to the key released by the player from the sound system 6 is stopped.

The determiner 103 determines whether another pitch is designated at the point in time at which the designation receiver 101 detects the designation information indicating a note-off (step S23). As described above, the determiner 103 saves the designation information indicating a note-on. Therefore, the determiner 103 can determine whether the another pitch is designated at the point in time at which the designation information is received.

In a case where another pitch is not designated, the resonance sound instructor 104 instructs the producer 105 to stop producing resonance sound signals (step S24). The producer 105 stops producing the resonance sound signals based on the instruction provided by the resonance sound instructor 104 (step S25). Thus, the output of resonance sounds from the sound system 6 is stopped. For example, in a case where all of the keys are released, generation of resonance sounds is stopped. In a case where resonance sounds are not being generated at the point in time at which the process proceeds to the step S24, the instruction for stopping the generation of resonance sounds is not provided. Thereafter, the designation receiver 101 returns to the step S11 (FIG. 3).

In a case where another pitch is designated in the step S23, the resonance sound instructor 104 instructs the producer 105 to continue producing resonance sound signals (step S26). Specifically, the resonance sound instructor 104 instructs the producer 105 to continue producing a resonance sound signal of the another pitch based on the pitch designated by the note-off and the another pitch and allows the producer 105 to stop producing the resonance sound signal of the pitch designated by a note-off.

The producer 105 continues producing the resonance sound signals for a certain period of time based on the instruction provided by the resonance sound instructor 104 (step S27). For example, in the case where part of the keys is released while chords are being played, generation of resonance sounds continues in regards to the keys that continue to be depressed.

(4) Effects of First Embodiment

According to the present embodiment, on the assumption that the electronic musical apparatus is an acoustic piano, in the case where another pitch is designated when one pitch is designated, the resonance sound signals of the resonance sounds that are generated when the string of one pitch and the string of the another pitch resonate with each other are produced. On the other hand, in the case where another pitch is not designated when one pitch is designated, resonance sound signals are not produced. Thus, when a single sound is designated, a resonance sound signal is not produced. Therefore, the resonance sound signal generation device 100 can accurately reproduce the resonance sounds generated in a natural keyboard musical instrument such as an acoustic piano.

Further, according to the present embodiment, also in the case where designation of part of the pitches is canceled in a case where a plurality of pitches are designated, production of resonance sound signals continues. Thus, resonance sounds generated in the natural keyboard musical instrument such as an acoustic piano can be reproduced more accurately.

Further, according to the present embodiment, in a case where designation of all of the pitches is canceled, production of resonance sound signals is stopped. Thus, resonance sounds generated in the natural keyboard musical instrument such as an acoustic piano can be reproduced more accurately.

[3] Second Embodiment

Next, a resonance sound signal generation device, a resonance sound signal generation method, a non-transitory computer readable medium storing a resonance sound signal generation program and an electronic musical apparatus according to a second embodiment of the present invention will be described with reference to the drawings. The overall configuration of the electronic musical apparatus 1 is similar to that of the first embodiment shown in FIG. 1. Therefore, a description thereof will not be repeated. Furthermore, a description of the functions and configuration that are similar to those of the first embodiment will not be repeated.

(1) Arrangement in Keyboard of Performance Operator 2

Figure 5:
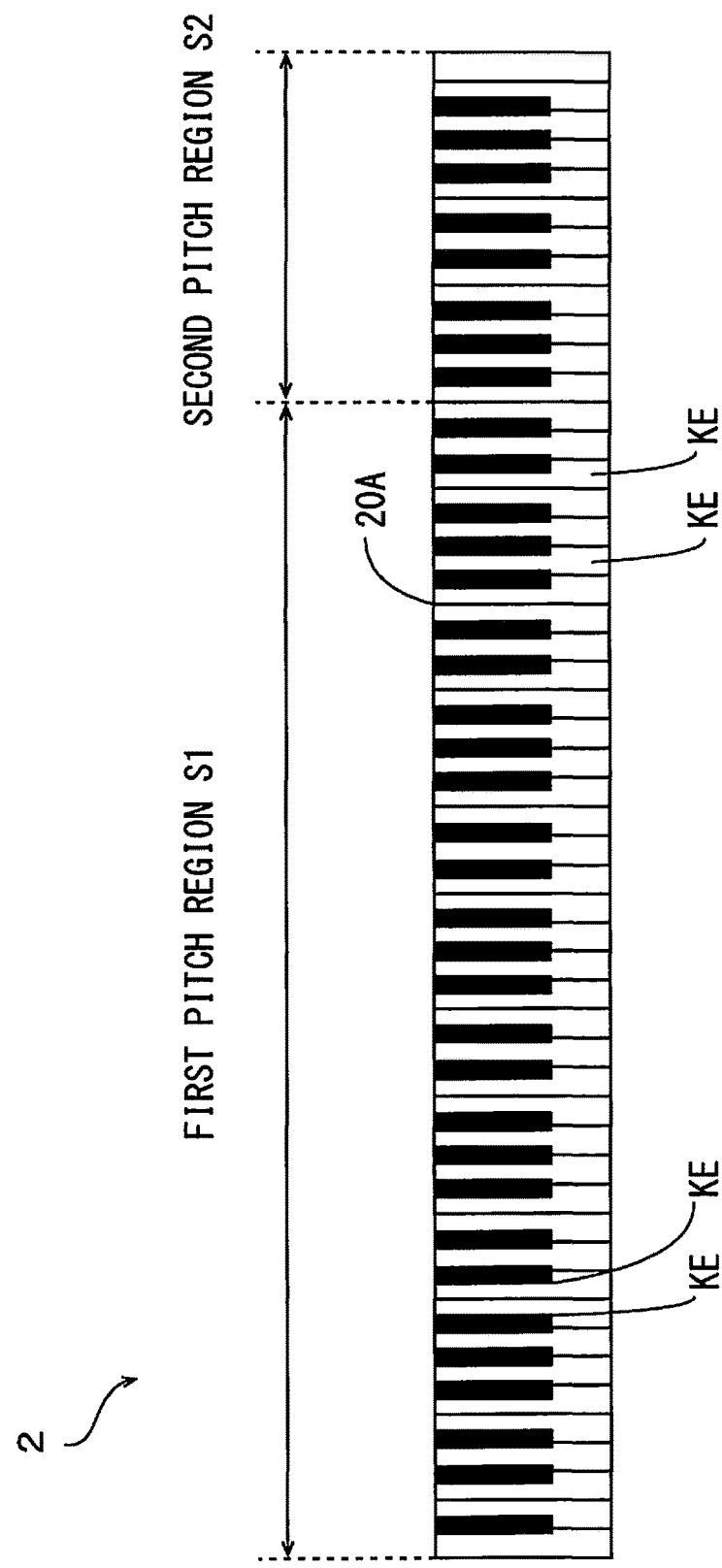
FIG. 5 is a diagram showing a performance operator according to a second embodiment.

FIG. 5 is a schematic diagram showing the performance operator 2 of FIG. 1. As shown in FIG. 5, in the second embodiment, the performance operator 2 includes a keyboard 20A. A plurality of keys KE are arranged in a row in the keyboard 20A. The pitches that ascend in order from the left to the right correspond to the plurality of keys KE arranged in a row.

In the present embodiment, the keyboard 20A includes 88 keys KE. However, the number of keys included in the keyboard 20A is not limited to this. In the keyboard 20A in the second embodiment, 88 keys KE are divided into two pitch regions as shown in FIG. 5. The keys in a first pitch region S1 have the function similar to that of the keys having dampers in the acoustic piano. The keys in a second pitch region S2 have the function similar to that of the keys not having dampers in the acoustic piano. That is, in a case where none of the keys KE is depressed by a player, the control similar to the control that is carried out in a case where dampers are working on all of the keys KE in the first pitch region S1 is carried out. In a case where any key KE is depressed by a player, resonance sounds are generated with regard to all of the keys KE in the second pitch region S2 regardless of whether any key KE is depressed in the second pitch region S2.

(2) Functional Configuration of Resonance Sound Signal Generation Device 100

Figure 6:
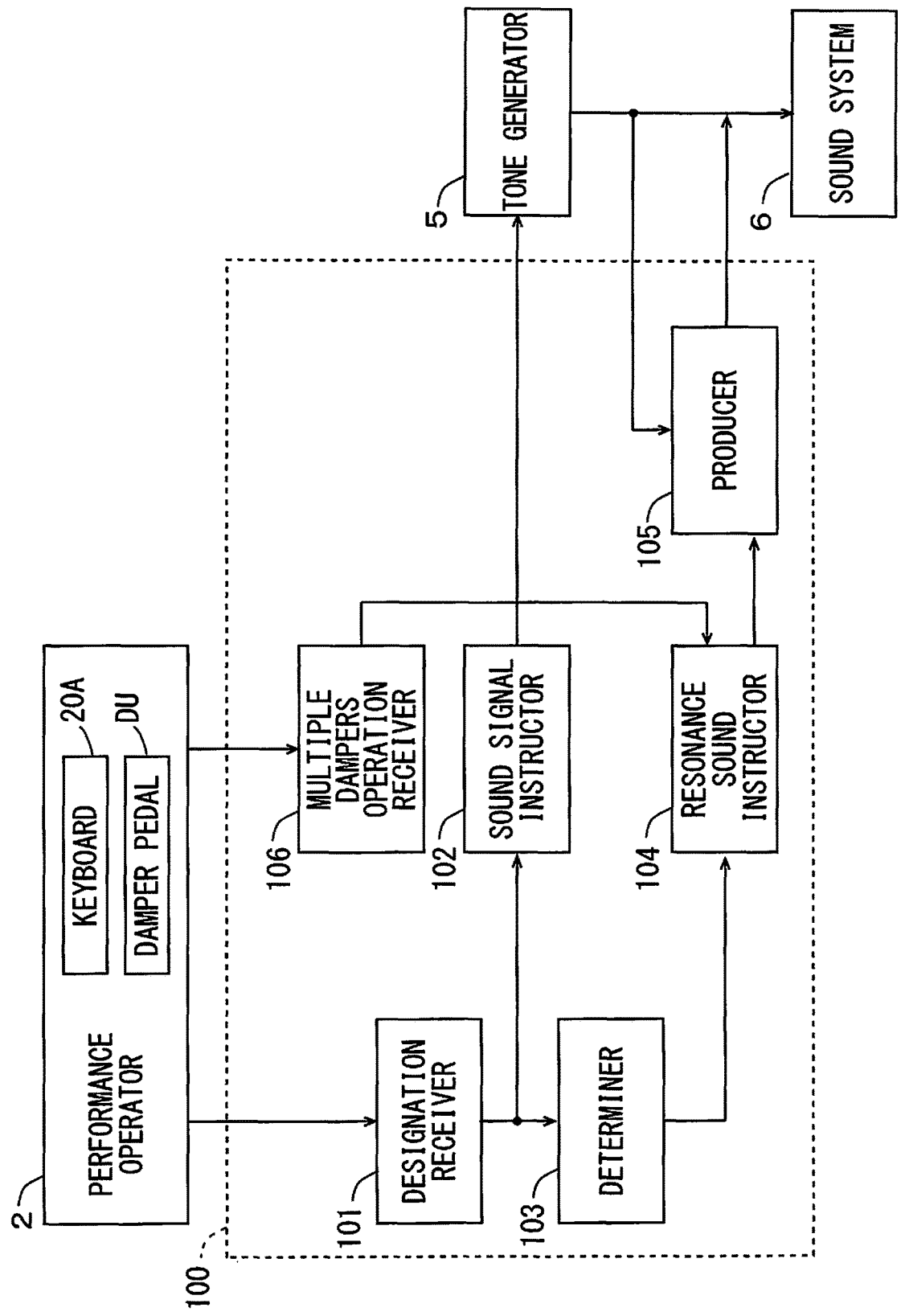
FIG. 6 is a block diagram showing the functional configuration of a resonance sound signal generation device and its peripheral devices according to the second embodiment.

FIG. 6 is a block diagram showing the functional configuration of the resonance sound signal generation device 100 and its peripheral devices. As shown in FIG. 6, the resonance sound signal generation device 100 includes a designation receiver 101, a sound signal instructor 102, a determiner 103, a resonance sound instructor 104, a producer 105 and a multiple dampers operation receiver 106. The CPU 8 of FIG. 1 executes the resonance sound signal generation program P1 stored in the storage device 7 or the ROM 11 while using the RAM 10 as a working area, whereby the function of each constituent (101 to 106) of the resonance sound signal generation device 100 is realized.

The functions of the designation receiver 101, the sound signal instructor 102 and the producer 105 in FIG. 6 are similar to those of the first embodiment. Therefore, a description thereof will not be repeated.

The performance operator 2 has the above-mentioned keyboard 20A and a damper pedal DU. As described above, the keys KE in the first pitch region S1 have the function similar to that of the keys having dampers in an acoustic piano. When the player depresses the damper pedal DU with his or her foot, the damper effect that is applied to the first pitch region S1 is canceled. That is, the damper effect applied to all of the keys KE in the first pitch region S1 is canceled all at once. Cancellation of the damper effect means that the control is carried out to apply the effect similar to the effect of a release of a damper from a string corresponding to each key in an acoustic piano. When the player releases his or her foot from the damper pedal DU, the damper effect is applied to the first pitch region S1. Application of the damper effect means that the control is carried out to apply the effect similar to the effect of a contact of a damper with a string corresponding to each key in the acoustic piano. The performance operator 2 for receiving an operation of applying or canceling the damper effect may be a switch, a button, etc. as well as a pedal.

When receiving an operation of applying or canceling the damper effect, the damper pedal DU supplies the damper information indicating the application or cancellation of the damper effect to the multiple dampers operation receiver 106. The multiple dampers operation receiver 106 supplies the damper information to the resonance sound instructor 104.

In a case where the resonance sound instructor 104 receives the damper information indicating application of the damper effect from the multiple dampers operation receiver 106, that is, in a case where it is detected that the player has released his or her foot from the damper pedal DU, the resonance sound instructor 104 instructs the producer 105 to continue and stop producing resonance sound signals. Specifically, the resonance sound instructor 104 instructs the producer 105 to produce a resonance sound signal of the designated pitch and resonance sound signals of pitches in the second pitch region S2 based on the designated pitch. Further, the resonance sound instructor 104 instructs the producer 105 to stop producing a resonance sound signal of a pitch in the first pitch region S1 except for the designated pitch.

In a case where the resonance sound instructor 104 receives the damper information indicating the cancellation of the damper effect from the multiple dampers operation receiver 106, that is, in a case where it is detected that the player has depressed the damper pedal DU with his or her foot, the resonance sound instructor 104 instructs the producer 105 to produce resonance sound signals. Specifically, the resonance sound instructor 104 instructs the producer 105 to produce resonance sound signals of pitches in the first pitch region S1 and resonance sound signals of pitches in the second pitch region S2 based on designated pitches. That is, resonance sounds are generated with regard to all of the pitches corresponding to the 88 keys.

(3) One Example of Resonance Sound Signal Generation Method

Figure 7:
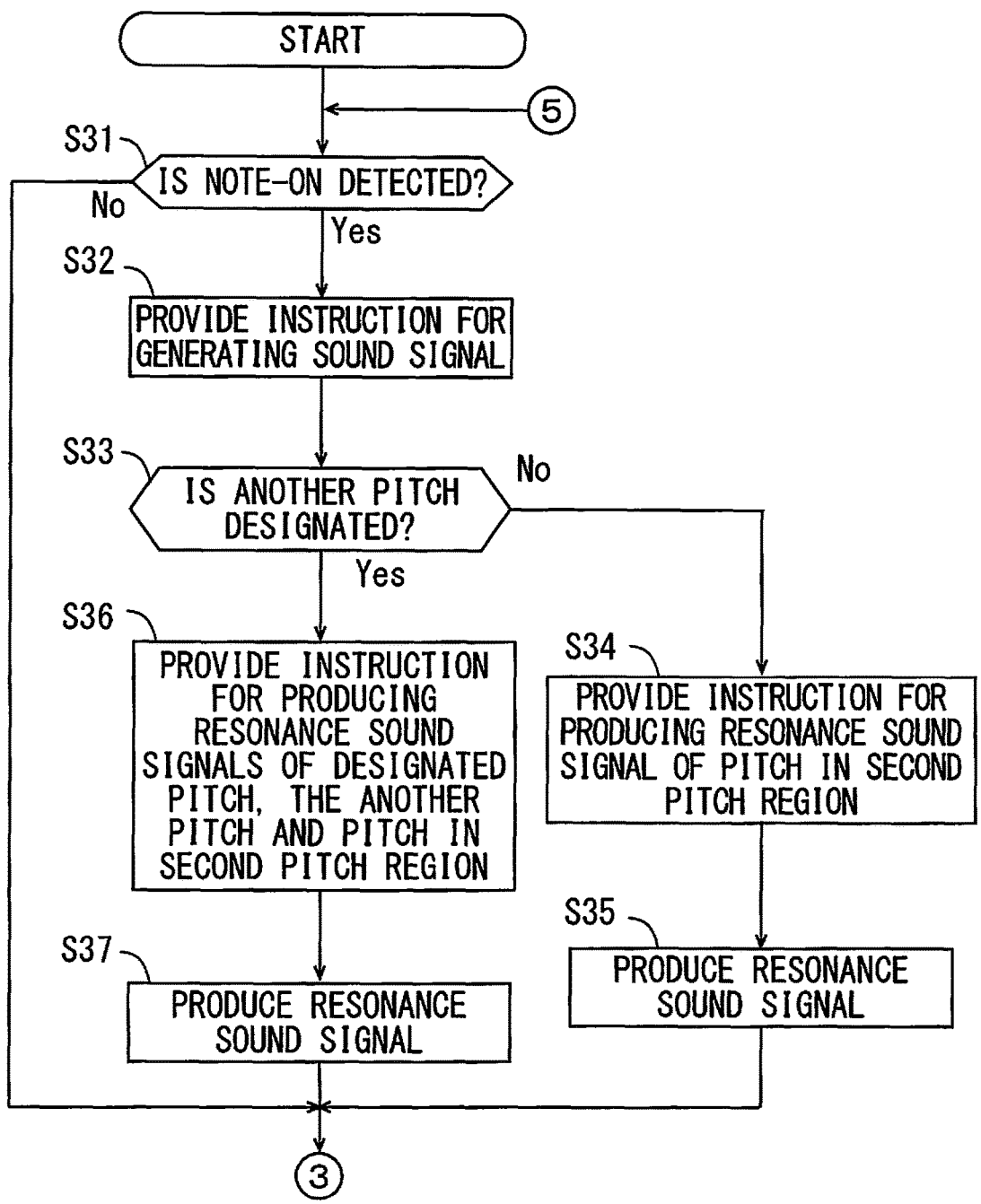
FIG. 7 is a flow chart showing a resonance sound signal generation method in the resonance sound signal generation device according to the second embodiment.
Figure 8:
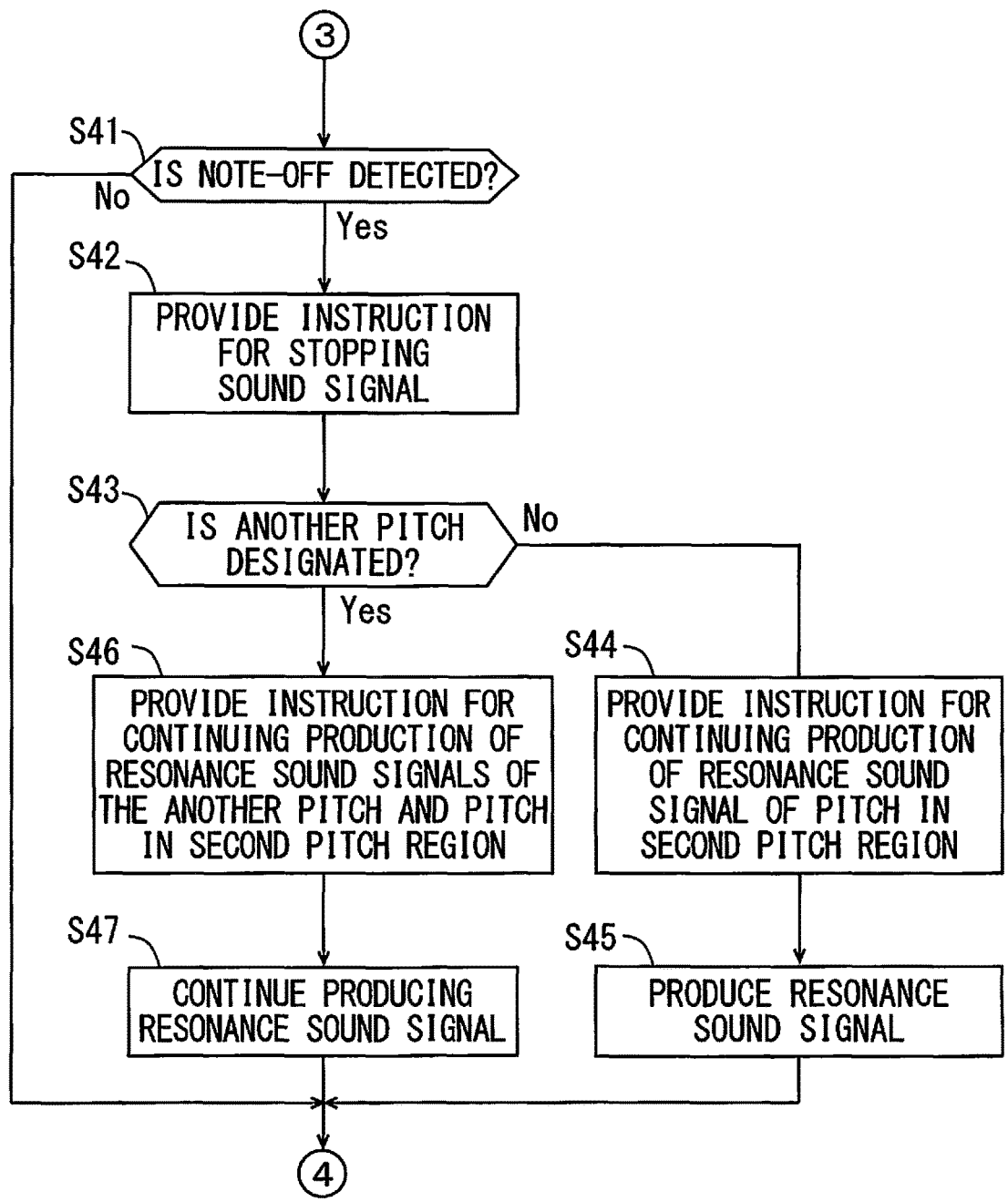
FIG. 8 is a flow chart showing the resonance sound signal generation method in the resonance sound signal generation device according to the second embodiment.
Figure 9:
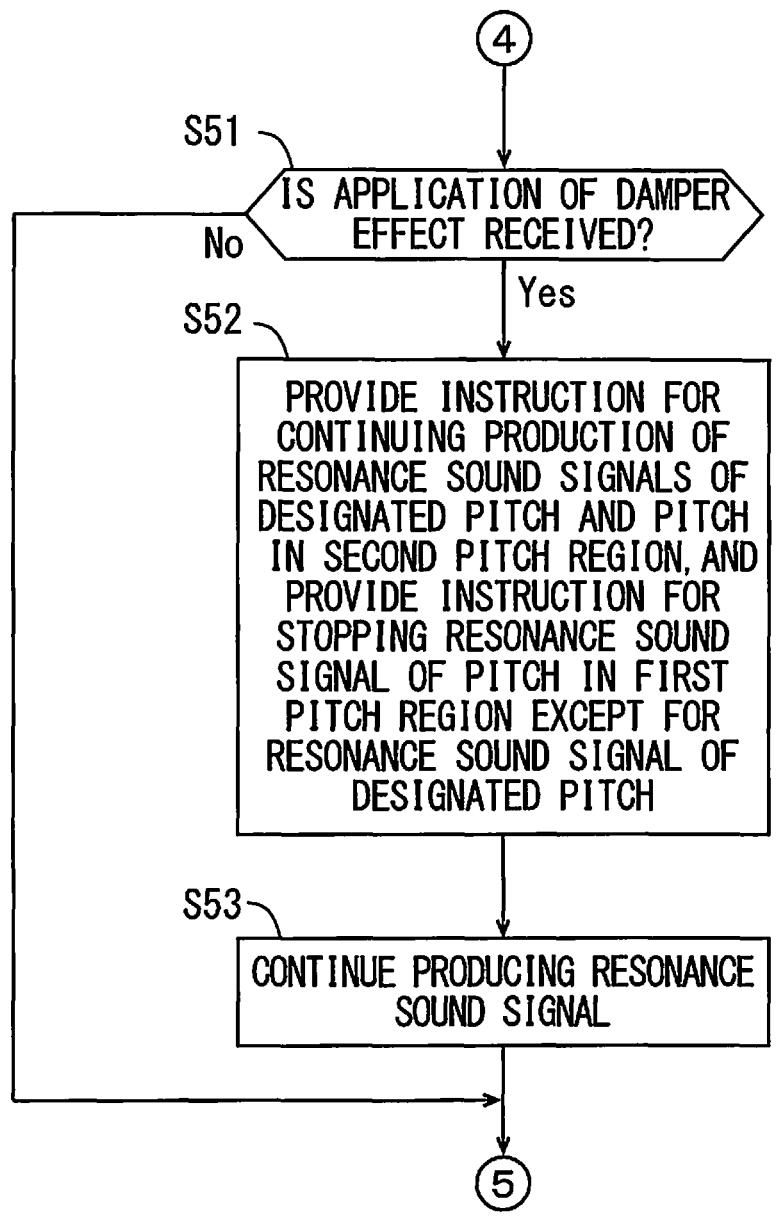
FIG. 9 is a flow chart showing the resonance sound signal generation method in the resonance sound signal generation device according to the second embodiment.

FIGS. 7 to 9 are flow charts showing the resonance sound signal generation method in the resonance sound signal generation device 100 of FIG. 6. The resonance sound signal generation method of FIGS. 7 to 9 is performed by execution by the CPU 8 of FIG. 1 of the resonance sound signal generation program P1 stored in the storage device 7 or the ROM 11.

Reference will be made to FIG. 7. The designation receiver 101 determines whether the designation information indicating a note-on has been detected (step S31). When the player depresses any key in the performance operator 2, the performance operator 2 supplies the designation information indicating a note-on of the pitch corresponding to the depressed key to the designation receiver 101.

In a case where the designation information indicating a note-on is not detected, the designation receiver 101 proceeds to the step S41 (FIG. 8).

In a case where the designation receiver 101 detects the designation information indicating a note-on, the sound signal instructor 102 instructs the tone generator 5 to generate a sound signal corresponding to the pitch designated by the designation information (step S32). The tone generator 5 outputs the audio data corresponding to the designated pitch to a sound system 6. The sound system 6 converts the audio data into an analogue sound signal and outputs the sound corresponding to the converted analogue sound signal from a speaker. Thus, the sound corresponding to the key depressed by the player is output from the sound system 6.

In a case where the designation receiver 101 detects the designation information indicating a note-on, the determiner 103 determines whether another pitch is already designated at the point in time at which the designation information is received (step S33). As described above, the determiner 103 saves the designation information indicating a note-on. The determiner 103 can determine whether another pitch is designated at the point in time at which the designation information is received.

When the determiner 103 determines that another pitch is not designated, the resonance sound instructor 104 instructs the producer 105 to produce resonance sound signals (step S34). Specifically, the resonance sound instructor 104 instructs the producer 105 to produce resonance sound signals of the pitches in the second pitch region S2 based on the pitch designated by the note-on. The resonance sound instructor 104 may instruct the producer 105 to produce resonance sound signals of the pitch designated by the note-on and the resonance sound signals of the pitches in the second pitch region S2 based on the pitch designated by the note-on.

The producer 105 produces resonance sound signals based on the instruction provided by the resonance sound instructor 104 (step S35). The resonance sound signals produced by the producer 105 are supplied to the sound system 6 and output as resonance sounds. After the resonance sound signals are produced, the designation receiver 101 proceeds to the step S41 (FIG. 8).

When the determiner 103 determines that another pitch is designated, the resonance sound instructor 104 instructs the producer 105 to produce resonance sound signals (step S36). Specifically, the resonance sound instructor 104 instructs the producer 105 to produce the resonance sound signal of the pitch designated by a note-on, the resonance sound signal of the another pitch and the resonance sound signals of the pitches in the second pitch region S2 based on the pitch designated by the note-on and the another pitch.

The producer 105 produces resonance sound signals based on the instruction provided by the resonance sound instructor 104 (step S37). The resonance sound signals produced by the producer 105 are supplied to the sound system 6 and output as resonance sounds. Next, the designation receiver 101 proceeds to the step S41 (FIG. 8).

Reference will be made to FIG. 8. Subsequently, the designation receiver 101 determines whether the designation information indicating a note-off is detected (step S41). When the player releases any key KE in the performance operator 2, the performance operator 2 supplies the designation information indicating a note-off of the pitch corresponding to the released key KE to the designation receiver 101.

In a case where the designation receiver 101 detects the designation information indicating a note-off, the sound signal instructor 102 instructs the tone generator 5 to stop producing the sound signal corresponding to the pitch designated by the designation information (step S42). The tone generator 5 stops the output of the audio data corresponding to the designated pitch. Thus, the output of the sound corresponding to the key KE released by the player from the sound system 6 is stopped.

In a case where the designation receiver 101 detects the designation information indicating a note-off, the determiner 103 determines whether another pitch is designated (step S43). As described above, the determiner 103 saves the designation information indicating a note-on. The determiner 103 can determine whether another pitch is designated at the point in time at which the designation information is received.

When the determiner 103 determines that another pitch is not designated, the resonance sound instructor 104 instructs the producer 105 to continue producing resonance sound signals (step S44). Specifically, the resonance sound instructor 104 instructs the producer 105 to continue producing the resonance sound signals of the pitches in the second pitch region S2 based on the pitch designated by the note-off.

The producer 105 continues producing the resonance sound signals based on the instruction provided by the resonance sound instructor 104 (step S45). The resonance sound signals produced by the producer 105 are supplied to the sound system 6 and output as resonance sounds.

When the determiner 103 determines that another pitch is designated, the resonance sound instructor 104 instructs the producer 105 to continue producing resonance sound signals (step S46). Specifically, the resonance sound instructor 104 instructs the producer 105 to continue producing the resonance sound signal of the another pitch and the resonance sound signals of the pitches in the second pitch region S2 based on the pitch designated by the note-off and the another pitch. Specifically, the resonance sound instructor 104 stops production of the resonance sound signal of the pitch designated by the note-off, and provides an instruction for continuing production of the resonance sound signal of the another pitch and the resonance sound signals of the pitches in the second pitch region S2 based on the pitch designated by the note-off and the another pitch.

The producer 105 continues producing the resonance sound signals based on the instruction provided by the resonance sound instructor 104 (step S47). The resonance sound signals produced by the producer 105 are supplied to the sound system 6 and output as resonance sounds.

In the case where the designation receiver 101 does not detect the designation information indicating a note-off in the step S41, or after the production of the resonance sounds is continued in the step S45 or the step S47, the multiple dampers operation receiver 106 determines whether the damper information indicating the application of the damper effect has been received from the damper pedal DU (step S51) as shown in FIG. 9.

In a case where the multiple dampers operation receiver 106 has not received the damper information indicating the application of the damper effect, the process returns to the step S31 (FIG. 7).

In a case where the multiple dampers operation receiver 106 has received the damper information indicating the application of the damper effect, the resonance sound instructor 104 instructs the producer 105 to continue producing and stop producing the resonance sound signals based on the damper information (step S52). Specifically, the resonance sound instructor 104 instructs the producer 105 to continue producing the resonance sound signal of the designated pitch, and the resonance sound signal of the pitches in the second pitch region S2 based on the designated pitch. Further, the resonance sound instructor 104 instructs the producer 105 to stop producing resonance sound signals of all of the pitches in the first pitch region S1 except for the designated pitch.

The producer 105 continues producing the resonance sound signals based on the instruction provided by the resonance sound instructor 104 (step S53). The resonance sound signals produced by the producer 105 are supplied to the sound system 6 and output as resonance sounds. After the resonance sounds are produced in the step S53, the process returns to the step S31 (FIG. 7) that is performed by the designation receiver 101. In FIG. 9, the process to be carried out in case of cancellation of the damper effect is not described. When the damper effect is canceled, resonance sounds are generated with regard to all of pitches in the first pitch region S1 and the second pitch region S2 based on the designated pitch as described above.

(4) Effects of Second Embodiment

According to the resonance sound signal generation device 100 in the present embodiment, on the assumption that the electronic musical apparatus is an acoustic piano, in the case where another pitch is designated when one pitch is designated, the resonance sound signals of the resonance sounds that are generated when the string of one pitch and the string of the another pitch resonate with each other are produced. Further, the resonance sound signal generation device generates the resonance sounds of the pitches in the second pitch region based on the one pitch and the another pitch. On the other hand, in the case where another pitch is not designated when the one pitch is designated, the resonance sound signal generation device generates the resonance sound signals of the pitches in the second pitch region. When a plurality of pitches are designated, the resonance sounds of the plurality of pitches and the resonance sounds of the pitches in the second pitch region are produced. Thus, the resonance sound generated in a natural keyboard musical instrument such as an acoustic piano can be reproduced more accurately. Further, when a single sound is designated, the resonance sounds of the pitches in the second pitch region are produced based on the designated pitch, so that the resonance sound signal generation device 100 can reproduce the resonance sound generated in the acoustic piano more accurately.

According to the resonance sound signal generation device 100 of the present embodiment, in a case where designation of all pitches is canceled, production of the resonance sound signals of the pitches in the second pitch region continues. The resonance sound signal generation device 100 can reproduce resonance sounds generated in a natural keyboard musical instrument such as an acoustic piano more accurately.

According to the resonance sound signal generation device 100 in the present embodiment, in a case where the information indicating the application of the damper effect is received, the production of the resonance sound signal of the designated pitch and the resonance sound signals of the pitches in the second pitch region continues. Further, the production of the resonance sound signals is stopped in regards to the first pitch region to which the damper effect is applied. The resonance sound signal generation device 100 can reproduce the resonance sounds generated in a natural keyboard musical instrument such as an acoustic piano more accurately.

[4] Reference Embodiment

Next, a resonance sound signal generation device, a resonance sound signal generation method, a non-transitory computer readable medium storing a resonance sound signal generation program and an electronic musical apparatus according to a reference embodiment will be described in detail with reference to the drawings. The overall configuration of the electronic musical apparatus 1 is similar to that of the first and second embodiments shown in FIG. 1. Therefore, a description thereof will not be repeated. Furthermore, as for the description of the configuration and function similar to those of the first and second embodiments will not be repeated.

(1) Arrangement in Keyboard of Performance Operator 2

Figure 10:
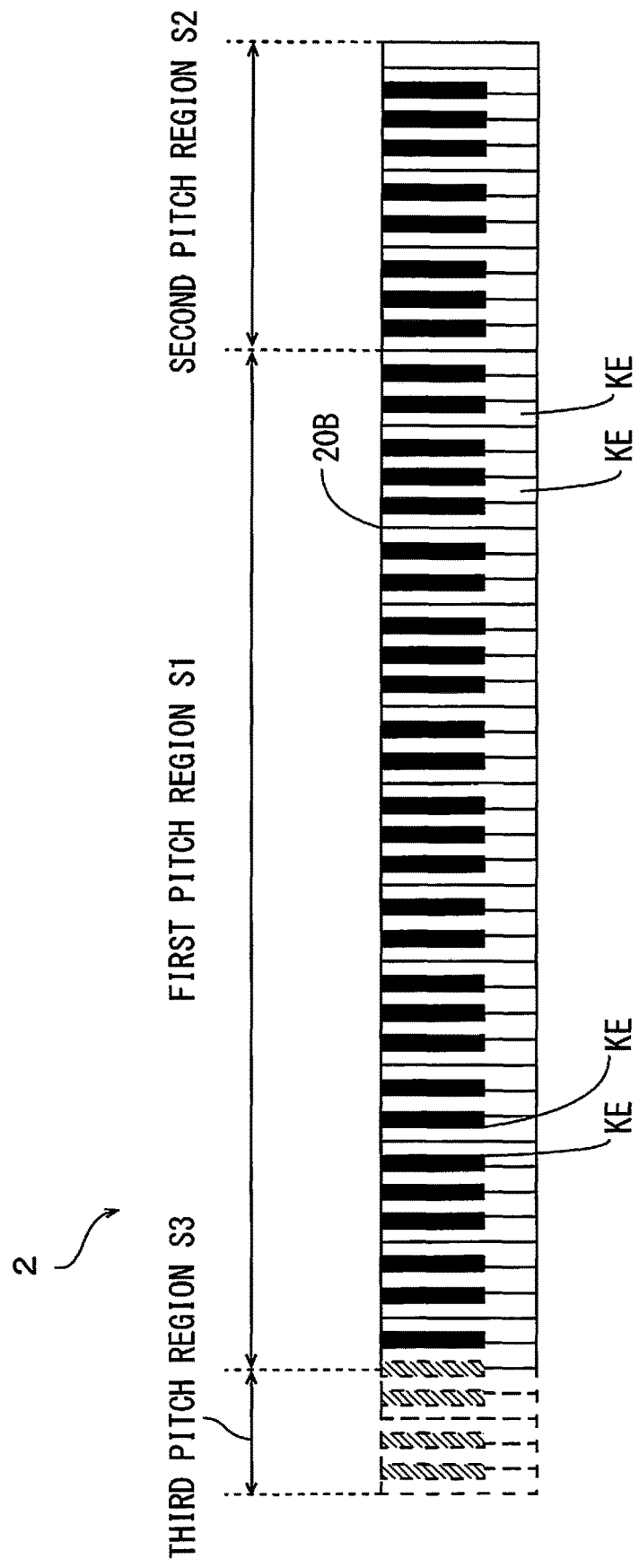
FIG. 10 is a diagram showing a performance operator according to a reference embodiment.

FIG. 10 is a schematic diagram showing the performance operator 2 of FIG. 1. As shown in FIG. 10, a performance operator 2 of the reference embodiment includes a keyboard 20B. The keyboard 20B has a plurality of keys KE arranged in a row. The pitches that ascend in order from the left to the right correspond to the plurality of keys KE arranged in a row.

In the reference embodiment, the keyboard 20B includes 88 keys. However, the number of keys included in the keyboard 20B is not limited to this. In the keyboard 20B in the reference embodiment, the 88 keys are divided into two pitch regions as shown in FIG. 10 similarly to the second embodiment. The keys in a first pitch region S1 have the function similar to that of the keys having dampers in an acoustic piano. The keys in a second pitch region S2 have the function similar to that of the keys not having dampers in an acoustic piano. Further, a third pitch region S3 that is a virtual pitch region is allocated to the keyboard 20B. An actual key is not included in the third pitch region S3. In the third pitch region S3, resonance sounds are produced when an enhancement mode is selected.

(2) Functional Configuration of Resonance Sound Signal Generation Device 100

Figure 11:
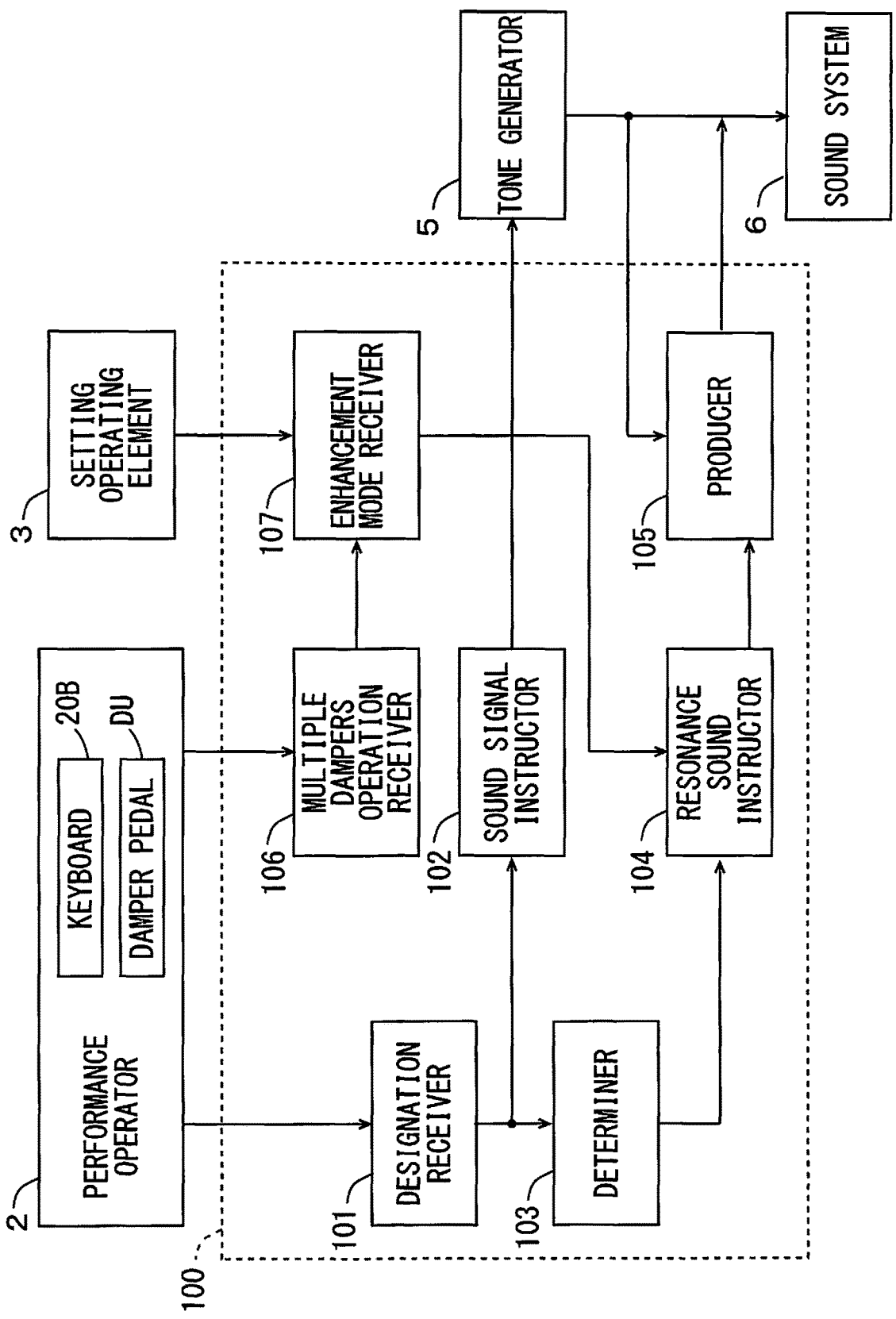
FIG. 11 is a block diagram showing the functional configuration of a resonance sound signal generation device and its peripheral devices according to the reference embodiment.

FIG. 11 is a block diagram showing the functional configuration of the resonance sound signal generation device 100 and its peripheral devices. As shown in FIG. 11, the resonance sound signal generation device 100 includes a designation receiver 101, a sound signal instructor 102, a determiner 103, a resonance sound instructor 104, a producer 105, a multiple dampers operation receiver 106 and an enhancement mode receiver 107. The CPU 8 of FIG. 1 executes a resonance sound signal generation program P1 stored in the storage device 7 or the ROM 11 while using the RAM 10 as a working area, whereby the function of each constituent (101 to 107) of the resonance sound signal generation device 100 is realized.

The functions of the performance operator 2, the designation receiver 101, the sound signal instructor 102, the producer 105 and the multiple dampers operation receiver 106 in FIG. 11 are similar to the functions of those in the first and second embodiments. Therefore, a description thereof will not be repeated.

A setting operating element 3 includes an enhancement mode setting switch. As described above, the third pitch region S3 is the virtual pitch region in which an actual key is not present. When the player turns on the enhancement mode setting switch, the mode in which a resonance sound is generated in the third pitch region S3 is put in the ON state. The setting operating element 3 for setting the enhancement mode may be a pedal, a button, etc. as well as a switch.

When the setting operating element 3 receives the setting of the enhancement mode, the setting operating element 3 supplies the enhancement mode information indicating an ON or OFF state of the enhancement mode to the enhancement mode receiver 107. When receiving the damper information indicating application of the damper effect from the multiple dampers operation receiver 106, the enhancement mode receiver 107 supplies the enhancement mode information to the resonance sound instructor 104.

In a case where the multiple dampers operation receiver 106 has received the damper information indicating the cancellation of the damper effect, and the resonance sound instructor 104 has received the enhancement mode information indicating the ON state of the enhancement mode from the enhancement mode receiver 107, that is, in a case where it is detected that a player has depressed a damper pedal DU with the enhancement mode switch turned on, the resonance sound instructor 104 instructs the producer 105 to generate resonance sound signals of pitches in the third pitch region S3. Specifically, the resonance sound instructor 104 instructs the producer 105 to produce the resonance sound signal of a designated pitch and the resonance sound signals of the pitches in the third pitch region S3 based on the designated pitch.

In a case where having received the enhancement mode information indicating the OFF state of the enhancement mode from the enhancement mode receiver 107, the resonance sound instructor 104 instructs the producer 105 to stop producing the resonance sound signal of the pitches in the third pitch region S3. Specifically, the resonance sound instructor 104 instructs the producer 105 to stop producing the resonance sound signals of the pitches in the third pitch region S3 based on the designated pitch. In a case where a resonance sound of a pitch outside of the third pitch region S3 is produced, production of the resonance sounds continues.

(3) One Example of Resonance Sound Signal Generation Method

Figure 12:
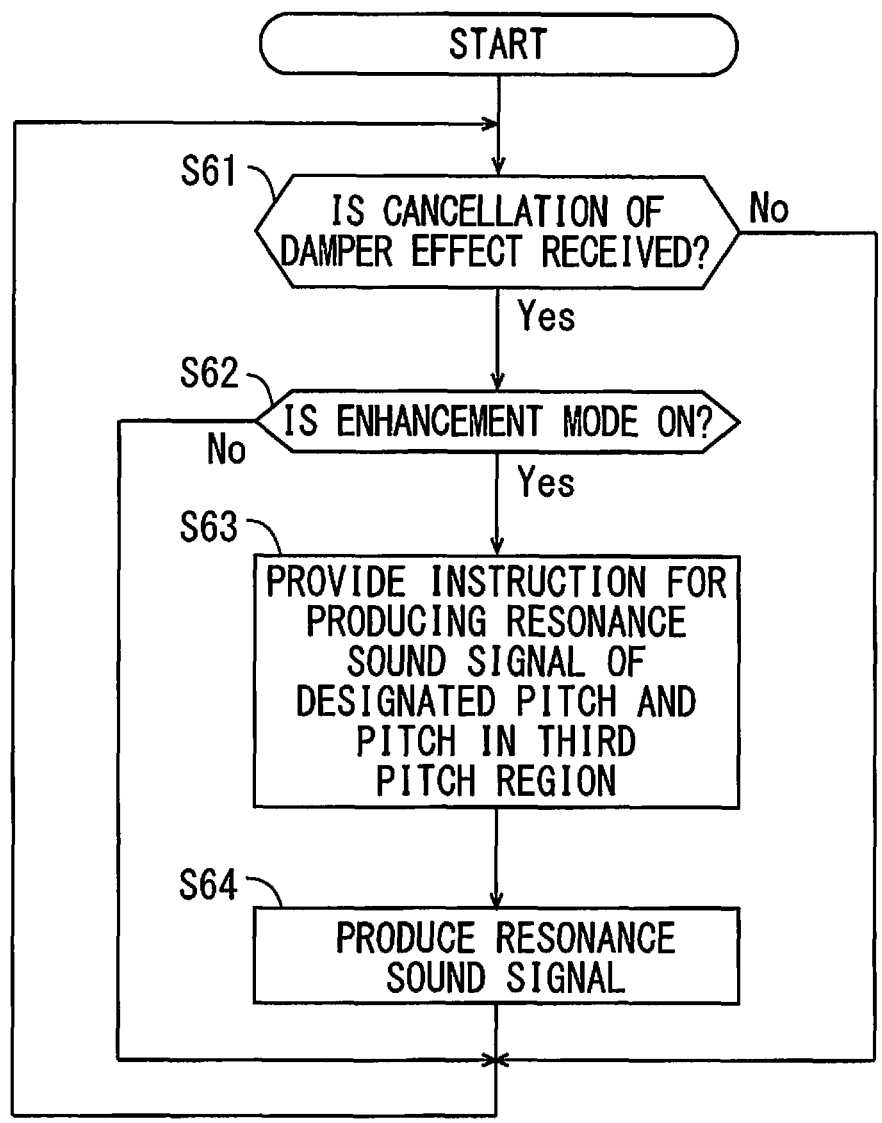
FIG. 12 is a flow chart showing a resonance sound signal generation method in the resonance sound signal generation device according to the reference embodiment.

FIG. 12 is a flow chart showing the resonance sound signal generation method in the resonance sound signal generation device 100 of FIG. 11. The resonance sound signal generation method of FIG. 12 is performed when the CPU 8 of FIG. 1 executes the resonance sound signal generation program P1 stored in the storage device 7 or the ROM 11.

First, it is determined whether the multiple dampers operation receiver 106 has received the damper information indicating the cancellation of the damper effect from the damper pedal DU (step S61).

In a case where the multiple dampers operation receiver 106 has not received the damper information indicating the cancellation of the damper effect from the damper pedal DU, the multiple dampers operation receiver 106 repeats the step S61.

In a case where the multiple dampers operation receiver 106 receives the damper information indicating the cancellation of the damper effect from the damper pedal DU, determination is made on whether the enhancement mode receiver 107 has received the enhancement mode information indicating the ON state of the enhancement mode from the setting operating element 3 (step S62). The enhancement mode receiver 107 saves the enhancement mode information. Therefore, the enhancement mode receiver 107 can determine whether the enhancement mode is in the ON or OFF state. In a case where the enhancement mode receiver 107 has not received the enhancement mode information indicating the ON state of the enhancement mode from the setting operating element 3, the multiple dampers operation receiver 106 returns to the step S61.

In a case where the enhancement mode receiver 107 has received the enhancement mode information indicating the ON state of the enhancement mode from the setting operating element 3, the resonance sound instructor 104 instructs the producer 105 to produce the resonance sound signals of the pitches in the third pitch region S3 based on the enhancement mode information (step S63). Specifically, the resonance sound instructor 104 instructs the producer 105 to produce the resonance sound signal of a designated pitch and the resonance sounds of the pitches in the third pitch region S3 based on the designated pitch. In a case where the resonance sounds of the pitches in the first pitch region S1 and the pitches in the second pitch region S2 have been generated, the resonance sound instructor 104 instructs the producer 105 to continue producing the resonance sound signals of the pitches in the first pitch region S1 and the pitches in the second pitch region S2.

The producer 105 produces resonance sound signals based on the instruction provided by the resonance sound instructor 104 (step S64). The resonance sound signals produced by the producer 105 are supplied to a sound system 6 and is output as resonance sounds. After the step S64, the multiple dampers operation receiver 106 returns to the step S61.

As described above, the resonance sound signal generation device of the reference embodiment comprises the designation receiver that receives designation of a pitch in the first pitch region that includes the plurality of pitches and to which the damper effect is applied, the sound signal instructor that provides an instruction for generating a sound signal corresponding to a designated pitch, the producer that produces resonance sound signals representing resonance sounds based on the plurality of pitches, the multiple dampers operation receiver that receives the information indicating application or cancellation of the damper effect with respect to the plurality of pitches in the first pitch region, and the enhancement mode receiver that receives the information indicating the ON state of the enhancement mode in which generation of the resonance sound signals of the pitches in the third pitch region is enabled, the third pitch region being not designatable by the designation receiver, wherein the resonance sound instructor instructs the producer to produce the resonance sound signal of the designated pitch and the resonance sound signals of pitches in the third pitch region in a case where the enhancement mode is in the ON state at the time of reception of the information indicating the cancellation of the damper effect.

According to the resonance sound signal generation device 100 of the reference embodiment, in the case where the operation for turning on the enhancement mode is received and the damper information indicating the cancellation of the damper effect is received, the instruction for producing the resonance sound signal of a designated pitch and the resonance sound signals of the pitches in the third pitch region S3 is provided. The third pitch region S3 is an enhanced virtual sound region in which a key is not actually present. Resonance sounds of pitches in the enhancement region in which a key is not present are generated, so that the number of variations of musical performance is increased. In the reference embodiment, the third pitch region S3 is added for the pitches in a lower range than the pitches of a regular keyboard having 88 keys. According to the reference embodiment, resonance sounds of pitches in the lower range in which a key is not present are generated, so that the player can enjoy the resonance sounds of the pitches in the lower range, which cannot be provided by a regular keyboard.

Further, the resonance sound signal generation method of the reference embodiment includes receiving designation of a pitch in the first pitch region that includes the plurality of pitches and to which the damper effect is applied, providing an instruction for generating a sound signal corresponding to a designated pitch, producing resonances sound signals representing resonance sounds based on the plurality of pitches, receiving the information indicating application or cancellation of the damper effect with respect to the plurality of pitches in the first pitch region, and receiving the information indicating the ON state of the enhancement mode in which generation of the resonance sound signals of the pitches in the third pitch region is enabled, the third pitch region being not designatable, wherein the instruction for producing the resonance sound signal of the designated pitch and the resonance sound signals of the pitches in the third pitch region is provided in a case where the enhancement mode is in the ON state at the time of reception of the information indicating the cancellation of the damper effect.

Further, the resonance sound signal generation program of the reference embodiment allows a computer to execute a process of receiving designation of a pitch in the first pitch region that includes the plurality of pitches and to which the damper effect is applied, a process of providing an instruction for generating a sound signal corresponding to a designated pitch, a process of producing resonance sound signals representing resonance sounds based on the plurality of pitches, a process of receiving the information indicating application or cancellation of the damper effect with respect to the plurality of pitches in the first pitch region, and a process of receiving the information indicating the ON state of the enhancement mode in which generation of the resonance sound signals of the pitches in the third pitch region is enabled, the third pitch region being not designatable, wherein the resonance sound signal generation program provides an instruction for producing the resonance sound signal of the designated pitch and the resonance sound signals of the pitches in the third pitch region in a case where the enhancement mode is in the ON state at the time of reception of the information indicating the cancellation of the damper effect.

As an inventive example to which the reference embodiment is applied, a piano that is manufactured by Bösendorfer and has an extended bass range is suitable as one example. As compared to a conventional piano having 88 keys, the piano manufactured by Bösendorfer has added keys in the bass. The extended bass range of the piano manufactured by Bösendorfer can be simulated using the resonance sound signal generation device, method and program of the reference embodiment.

[5] Other Embodiments

In the above-mentioned embodiment, the designation receiver 101, the sound signal instructor 102, the determiner 103, the resonance sound instructor 104, the producer 105, the multiple dampers operation receiver 106 and the enhancement mode receiver 107 are realized by execution of the resonance sound signal generation program P1, by way of example. However, this is merely one example, and part or all of the designation receiver 101, the sound signal instructor 102, the determiner 103, the resonance sound instructor 104, the producer 105, the multiple dampers operation receiver 106 and the enhancement mode receiver 107 may be constituted by hardware. For example, the producer 105 is constituted by a DSP (Digital Signal Processor) that is dedicated hardware, so that a resonance sound can be produced faster.

In the above-mentioned embodiment, the electronic keyboard musical instrument including a keyboard is described as an example of the electronic musical apparatus 1. As another example, the electronic musical apparatus 1 may be musical performance software by which a keyboard is displayed on a touch panel display and a player can perform by touching the keyboard displayed on the touch panel display. While the electronic musical apparatus has 88 keys in the second embodiment by way of example, the number of keys may be a different number such as 61. In this case, the 61 keys include a first pitch region and a second pitch region. Although the number of keys is reduced, a resonance sound of a high pitch such as a resonance sound generated in an acoustic piano is generated. While the electronic musical apparatus has 61 keys in the first embodiment by way of example, the number of keys may be 88. Although a sound region having 88 keys is provided, the control is not as complicated as the control of the second embodiment. Thus, a cost advantage is achieved.

In the above-mentioned embodiment, the producer 105 produces a resonance sound signal based on the sound signal output from the tone generator 5 and the instruction provided by the resonance sound instructor 104. As another example, resonance sound signals of all patterns may be stored in advance in the ROM 11 as audio data, which is sampling data, and the resonance sound signals may be read from the ROM 11 as necessary.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:
1. A resonance sound signal generation device comprising:
  a designation receiver configured to receive designation of a pitch;
  a sound signal instructor configured to provide an instruction for generating a sound signal corresponding to the designated pitch;

a producer configured to produce a resonance sound signal representing a resonance sound based on a plurality of pitches;

a determiner configured to determine whether another pitch is designated at a time of designation of one pitch; and a resonance sound instructor configured to instruct the producer to produce a resonance sound signal of the one pitch based on the another pitch and a resonance sound signal of the another pitch based on the one pitch in a case where a determination is made that the another pitch is designated at the time of designation of the one pitch, and configured to not instruct the producer to produce a resonance sound signal in a case where a determination is made that the another pitch is not designated at the time of designation of the one pitch.

2. The resonance sound signal generation device according to claim 1, wherein the resonance sound instructor is configured to instruct the producer to continue producing a resonance sound signal of the another pitch based on a third pitch in a case where the another pitch and the third pitch are designated at a time of cancellation of designation of the third pitch.

3. The resonance sound signal generation device according to claim 1, wherein the resonance sound instructor is configured to instruct the producer to stop producing resonance sound signals in a case where no other pitch is designated at a time of cancellation of designation of any pitch.

4. A resonance sound signal generation device comprising:

a designation receiver configured to receive designation of a pitch in a first pitch region that includes a plurality of pitches and to which a damper effect is assigned and to receive designation of a pitch in a second pitch region that includes one or more pitches and to which the damper effect is not assigned;

a sound signal instructor configured to provide an instruction for generating a sound signal corresponding to a designated pitch;

a producer configured to produce resonance sound signals representing resonance sounds based on the plurality of pitches;

a determiner configured to determine whether another pitch is designated at a time of designation of one pitch; and a resonance sound instructor configured to instruct the producer to produce a resonance sound signal of the one pitch, a resonance sound signal of the another pitch, and a resonance sound signal of a pitch in the second pitch region based on the one pitch and the another pitch in a case where a determination is made that the another pitch is designated at the time of designation of the one pitch, and configured to instruct the producer to produce the resonance sound signal of the pitch in the second pitch region based on the one pitch in a case where a determination is made that the another pitch is not designated at the time of designation of the one pitch.

5. The resonance sound signal generation device according to claim 4, wherein the resonance sound instructor is configured to instruct the producer to continue producing the resonance sound signal of the pitch in the second pitch region in a case where no other pitch is designated at a time of cancellation of designation of any pitch.

6. The resonance sound signal generation device according to claim 4, further comprising a multiple dampers operation receiver configured to receive information indicating application or cancellation of the damper effect with respect to the plurality of pitches in the first pitch region, wherein the resonance sound instructor is configured to instruct the producer to continue producing a resonance sound signal of the designated pitch and the resonance sound signal of the pitch in the second pitch region, and to instruct the producer to stop producing a resonance sound signal of a pitch in the first pitch region except for the resonance sound signal of the designated pitch, at a time of reception of the information indicating application of the damper effect.

7. The resonance sound signal generation device according to claim 6, further comprising an enhancement mode receiver configured to receive information indicating an enhancement mode in which generation of a resonance sound signal of a pitch in a third pitch region is enabled, the third pitch region being not designatable by the designation receiver, wherein the resonance sound instructor is configured to instruct the producer to produce the resonance sound signal of the designated pitch and a resonance sound signal of a pitch in the third pitch region in a case where the enhancement mode is in an ON state at a time of reception of information indicating cancellation of the damper effect.

8. A resonance sound signal generation method including:
receiving designation of a pitch;
providing an instruction for generating a sound signal corresponding to the designated pitch;
producing a resonance sound signal representing a resonance sound based on a plurality of pitches;
determining whether another pitch is designated at a time of designation of one pitch; and
providing an instruction for producing a resonance sound signal of the one pitch based on the another pitch and a resonance sound signal of the another pitch based on the one pitch in a case where a determination is made that the another pitch is designated at the time of designation of the one pitch, and not providing an instruction for producing a resonance sound signal in a case where a determination is made that the another pitch is not designated at the time of designation of the one pitch.

9. The resonance sound signal generation method according to claim 8, further including providing an instruction for continuing production of a resonance sound signal of the another pitch based on a third pitch in a case where the another pitch and the third pitch are designated at a time of cancellation of designation of the third pitch.

10. The resonance sound signal generation method according to claim 8, further including providing an instruction for stopping production of resonance sound signals in a case where no other pitch is designated at a time of cancellation of designation of any pitch.

11. A resonance sound signal generation method including:

receiving designation of a pitch in a first pitch region that includes a plurality of pitches and to which a damper effect is assigned and receiving designation of a pitch in a second pitch region that includes one or more pitches and to which the damper effect is not assigned;

providing an instruction for generating a sound signal corresponding to a designated pitch;

producing resonance sound signals representing resonance sounds based on the plurality of pitches;

determining whether another pitch is designated at a time of designation of one pitch; and providing an instruction for producing a resonance sound signal of the one pitch, a resonance sound signal of the another pitch, and a resonance sound signal of a pitch in the second pitch region based on the one pitch and the another pitch in a case where a determination is made that the another pitch is designated at the time of designation of the one pitch, and providing an instruction for producing the resonance sound signal of the pitch in the second pitch region based on the one pitch in a case where a determination is made that the another pitch is not designated at the time of designation of the one pitch.

12. The resonance sound signal generation method according to claim 11, further including providing an instruction for continuing production of the resonance sound signal of the pitch in the second pitch region in a case where no other pitch is designated at a time of cancellation of designation of any pitch.

13. The resonance sound signal generation method according to claim 11, further including receiving information indicating application or cancellation of the damper effect with respect to the plurality of pitches in the first pitch region, wherein an instruction for continuing production of a resonance sound signal of the designated pitch and the resonance sound signal of the pitch in the second pitch region is provided, and an instruction for stopping production of a resonance sound signal of a pitch in the first pitch region except for the resonance sound signal of the designated pitch is provided, at a time of reception of the information indicating application of the damper effect.

14. The resonance sound signal generation method according to claim 13, further including receiving information indicating an enhancement mode in which generation of a resonance sound signal of a pitch in a third pitch region is enabled, the third pitch region being not designatable, wherein an instruction for producing the resonance sound signal of the designated pitch and a resonance sound signal of a pitch in the third pitch region is provided in a case where the enhancement mode is in an ON state at a time of reception of information indicating cancellation of the damper effect.

15. A non-transitory computer readable medium storing a resonance sound signal generation program, the resonance sound signal generation program allowing a computer to execute:

a process of receiving designation of a pitch;

a process of providing an instruction for generating a sound signal corresponding to the designated pitch;

a process of producing a resonance sound signal representing a resonance sound based on a plurality of pitches;

a process of determining whether another pitch is designated at a time of designation of one pitch; and a process of providing an instruction for producing a resonance sound signal of the one pitch based on the another pitch and a resonance sound signal of the another pitch based on the one pitch in a case where a determination is made that the another pitch is designated at the time of designation of the one pitch, and not providing an instruction for producing a resonance sound signal in a case where a determination is made that the another pitch is not designated at the time of designation of the one pitch.

16. An electronic musical apparatus comprising:

a plurality of performance operators configured to designate pitches, respectively;

the resonance sound signal generation device according to claim 1;

a tone generator configured to generate a sound signal as instructed by the resonance sound signal generation device; and an outputter configured to output a sound having a designated pitch and a resonance sound relating to the designated pitch based on the sound signal generated by the tone generator and a resonance sound signal produced by the resonance sound signal generation device.

17. An electronic musical apparatus comprising:

a plurality of performance operators configured to designate pitches, respectively;

the resonance sound signal generation device according to claim 4;

a tone generator configured to generate a sound signal as instructed by the resonance sound signal generation device; and an outputter configured to output a sound having a designated pitch and a resonance sound relating to the designated pitch based on the sound signal generated by the tone generator and resonance sound signals produced by the resonance sound signal generation device.

* * * * *